United States Patent
Demirel

(10) Patent No.: US 10,730,642 B2
(45) Date of Patent: Aug. 4, 2020

(54) OPERATION AND MAINTENANCE OF AVIONIC SYSTEMS

(71) Applicant: Airbus (S.A.S.)

(72) Inventor: Mustafa Demirel, Blagnac (FR)

(73) Assignee: Airbus (S.A.S.), Blagnac (FR)

(*) Notice: Subject to any disclaimer, the term of this patent is extended or adjusted under 35 U.S.C. 154(b) by 31 days.

(21) Appl. No.: 16/028,724

(22) Filed: Jul. 6, 2018

(65) Prior Publication Data

US 2019/0016477 A1 Jan. 17, 2019

(30) Foreign Application Priority Data

Jul. 13, 2017 (FR) .................................. 17 56662

(51) Int. Cl.
*B64F 5/60* (2017.01)
*G07C 5/08* (2006.01)
*G05B 23/02* (2006.01)

(52) U.S. Cl.
CPC .............. *B64F 5/60* (2017.01); *G05B 23/024* (2013.01); *G05B 23/0213* (2013.01); *G07C 5/0808* (2013.01); *G05B 23/0216* (2013.01)

(58) Field of Classification Search
CPC ..... B64F 5/40; B64F 5/60; G07C 5/00; G07C 5/0808; G07C 5/0841–0866; G05B 23/0205–0297; G01M 17/00; B64D 2045/0085

See application file for complete search history.

(56) References Cited

U.S. PATENT DOCUMENTS

| | | | | |
|---|---|---|---|---|
| 6,631,384 | B1* | 10/2003 | Richman | G06F 16/2477 |
| 7,124,059 | B2* | 10/2006 | Wetzer | G05B 23/0283 |
| | | | | 702/184 |
| 2002/0078403 | A1* | 6/2002 | Gullo | G06F 11/008 |
| | | | | 714/37 |
| 2002/0143421 | A1* | 10/2002 | Wetzer | G06Q 10/06 |
| | | | | 700/100 |
| 2005/0103354 | A1* | 5/2005 | Miyauchi | A61B 6/032 |
| | | | | 128/898 |
| 2008/0125933 | A1* | 5/2008 | Williams | G06Q 10/0637 |
| | | | | 701/29.5 |

(Continued)

FOREIGN PATENT DOCUMENTS

| | | | | |
|---|---|---|---|---|
| EP | 2175380 | A1 * | 4/2010 | ....... G06F 16/24556 |
| EP | 3 065 016 | A1 | 9/2016 | |
| FR | 3 009 396 | A1 | 2/2015 | |

OTHER PUBLICATIONS

J. E. Angus, "Lower confidence bound on the percentage improvement in comparing two failure rates," in IEEE Transactions on Reliability, vol. 41, No. 2, pp. 239-240, Jun. 1992.doi: 10.1109/24.257788 (Year: 1992).*

(Continued)

*Primary Examiner* — Jeffrey C Boomer
*Assistant Examiner* — Paul Allen
(74) *Attorney, Agent, or Firm* — Jenkins, Wilson, Taylor & Hunt, P.A.

(57) ABSTRACT

A method for evaluating a rate of change of a failure between a first unit type and a second unit type of an avionic system, the method taking into account, for each aircraft comprising the unit type, the number of flights made and the number of fault messages associated with the failure.

3 Claims, 2 Drawing Sheets

(56) References Cited

U.S. PATENT DOCUMENTS

| | | | |
|---|---|---|---|
| 2008/0159158 A1* | 7/2008 | Poisson | G06Q 10/06 370/249 |
| 2009/0312897 A1* | 12/2009 | Jamrosz | G06Q 10/06 701/32.1 |
| 2010/0152962 A1* | 6/2010 | Bennett | G07C 5/008 701/31.4 |
| 2014/0214263 A1* | 7/2014 | Boucher | B64F 5/60 701/31.8 |
| 2016/0342956 A1* | 11/2016 | Tucker | G06Q 10/20 |
| 2016/0364285 A1 | 12/2016 | Swayne et al. | |
| 2017/0169634 A1* | 6/2017 | Mattern | G07C 5/0841 |
| 2019/0304212 A1* | 10/2019 | Bailey | G06Q 10/20 |

OTHER PUBLICATIONS

JAEGLE—English Translation of EP-2175380-A1 via Espacenet patent translate, Mar. 13, 2020 (Year: 2020).*
French Search Report for French Application No. 1756662 dated Apr. 25, 2018.

* cited by examiner

OPERATION AND MAINTENANCE OF AVIONIC SYSTEMS

CROSS-REFERENCE TO RELATED APPLICATION

This application claims the benefit of and priority to French patent application number 17 56662 filed on Jul. 13, 2017, the entire disclosure of which is incorporated by reference herein.

TECHNICAL FIELD

The disclosure herein relates to the field of aeronautics, and more particularly that of the operation and maintenance of avionic systems.

BACKGROUND

Regulation in the aeronautical field obliges aircraft operators, such as the airlines, to produce in periodic fashion reliability reports relating to avionic systems. For this purpose, the operators principally have at their disposal three databases for preparing their reliability reports.

A first useable database is that comprising the configuration data of each aircraft. The configuration data of an aircraft correspond to the part numbers of the units of the avionic systems installed in the aircraft.

A second useable database is that relating to the flights of the aircraft. This second database comprises for example data like a date of departure, a departure airport, a date of arrival, a destination airport, a flight duration or a distance traveled.

A third useable database corresponds to that containing the post flight records originating from each aircraft. A post flight record typically contains warning messages and fault messages generated by an aircraft monitoring unit, for example an electronic centralized aircraft monitor or ECAM.

From these databases, the operators typically produce reports including, for a unit, an indicator such as a mean time between unit removal or an average time since installation. These indicators make it possible to obtain an understanding of the performance of a unit relating to its removal. However, when a unit is modified or replaced by another, no method currently allows a possible improvement in performance to be evaluated, for example, a reduction of a failure rate, linked with the modification or replacement of the unit.

It is therefore necessary to propose a solution allowing an evaluation of a rate of change of a failure.

SUMMARY

The disclosure herein relates to a method for evaluating a rate of change of a failure, the failure being associated with at least one warning message, between a first type of avionic unit associated with a first identifier, and a second type of avionic unit associated with a second identifier, the method being executed by an electronic device connected to a plurality of databases and comprising the steps of:
  connecting to a first database, the first database comprising a plurality of serial numbers, each serial number corresponding to an aircraft and being associated with a list, called configuration, comprising at least one identifier, each identifier corresponding to a type of avionic unit installed in the aircraft,
  extracting, from the first database, a first list, called first population, comprising all the serial numbers for which the first identifier is present in the configuration, and a second list, called second population, comprising all the serial numbers for which the second identifier is present in the configuration,
  connecting to a second database, the second database comprising a plurality of serial numbers, each serial number being associated with a list, called flights, comprising time and date stamped information corresponding to flights made by the aircraft associated with the serial number,
  determining, from the second database, for the serial numbers of the first population and the serial numbers of the second population, a cumulative number of flights made by each population during a predetermined period of time,
  connecting to a third database, the third database comprising a plurality of serial numbers, each serial number being associated with a list, called message, comprising monitoring messages received from at least one monitoring unit of the aircraft corresponding to the serial number,
  determining, from the third database, for the serial numbers of the first population and the serial numbers of the second population, a cumulative number of monitoring messages corresponding to the warning message or messages associated with the failure,
  determining a first failure occurrence rate associated with the first unit type, the first failure rate corresponding to a ratio between the cumulative number of monitoring messages for the first population and the cumulative number of flights for the first population and a second failure occurrence rate associated with the second unit type, the second failure rate corresponding to a ratio between the cumulative number of monitoring messages for the second population and the cumulative number of flights for the second population,
  determining the change rate as being equal to the difference between the second failure occurrence rate and the first failure occurrence rate divided by the first failure occurrence rate.

Advantageously, the disclosure herein makes it possible to measure objectively the advantage of a first unit type compared with a second unit type in respect of an investigated failure, the investigated failure corresponding to the selected monitoring—or fault—message or messages.

According to a complementary embodiment of the disclosure herein, the electronic device being suitable for presenting an interface to a user and comprising an input device, the method comprises a prior step of:
  presenting an interface to the user, the interface allowing the user to select:
    a first unit type,
    a second unit type,
    a period of time,
    one or more monitoring messages corresponding to a failure, and, for the subsequent steps of the method:
    the first identifier is equal to the identifier of the first unit type selected by the user,
    the second identifier is equal to the identifier of the second unit type selected by the user,
    the predetermined period of time is equal to the period of time defined by the user,
    the warning message or messages correspond to those defined by the user, the interface making it possible to display the determined change rate for the user.

Advantageously, a user can, after selecting the unit types and the type of the failure to be investigated, obtain an objective result for comparison regarding the efficiency of the two unit types in respect of an investigated failure.

The disclosure herein also relates to an electronic device allowing an evaluation of a rate of change of a failure, the failure being associated with at least one warning message, between a first type of avionic unit associated with a first identifier, and a second type of avionic unit associated with a second identifier, the electronic device being connected to a plurality of databases and being suitable for:

connecting to a first database, the first database comprising a plurality of serial numbers, each serial number corresponding to an aircraft and being associated with a list, called configuration, comprising at least one identifier, each identifier corresponding to a type of avionic unit installed in the aircraft, extracting, from the first database, a first list, called first population, comprising all the serial numbers for which the first identifier is present in the configuration, and a second list, called second population, comprising all the serial numbers for which the second identifier is present in the configuration, connecting to a second database, the second database comprising a plurality of serial numbers, each serial number being associated with a list, called flights, comprising time and date stamped information corresponding to flights made by the aircraft associated with the serial number, determining, from the second database, for the serial numbers of the first population and the serial numbers of the second population, a cumulative number of flights made by each population during a predetermined period of time, connecting to a third database, the third database comprising a plurality of serial numbers, each serial number being associated with a list, called message, comprising monitoring messages received from at least one monitoring unit of the aircraft corresponding to the serial number, determining, from the third database, for the serial numbers of the first population and the serial numbers of the second population, a cumulative number of monitoring messages corresponding to the warning message or messages associated with the failure, determining a first failure occurrence rate associated with the first unit type, the first failure rate corresponding to a ratio between the cumulative number of monitoring messages for the first population and the cumulative number of flights for the first population and a second failure occurrence rate associated with the second unit type, the second failure rate corresponding to a ratio between the cumulative number of monitoring messages for the second population and the cumulative number of flights for the second population, determining the rate of change as being equal to the difference between the second failure occurrence rate and the first failure occurrence rate divided by the first failure occurrence rate.

According to a complementary embodiment of the disclosure herein, the electronic device comprising an input device and being suitable for presenting an interface to a user, the electronic device is suitable for:

presenting an interface to the user, the interface allowing the user to select:
- a first unit type,
- a second unit type,
- a period of time,
- one or more monitoring messages corresponding to a failure, the interface making it possible to display the determined change rate for the user.

The disclosure herein also relates to a computer program that can be stored on a medium and/or downloaded from a communication network so as to be read by a processor. This computer program comprises instructions for implementing all or some of the steps of the aforementioned method for evaluating a rate of change of a failure, when the program is executed by the processor.

The disclosure herein also relates to an information storage medium or registration medium comprising such a computer program.

BRIEF DESCRIPTION OF THE DRAWINGS

The aforementioned characteristics of the disclosure herein, together with others, will emerge more clearly on reading the following description of an embodiment example, the description being made in relation to the attached drawings, among which.

DETAILED DESCRIPTION

Figure 1:
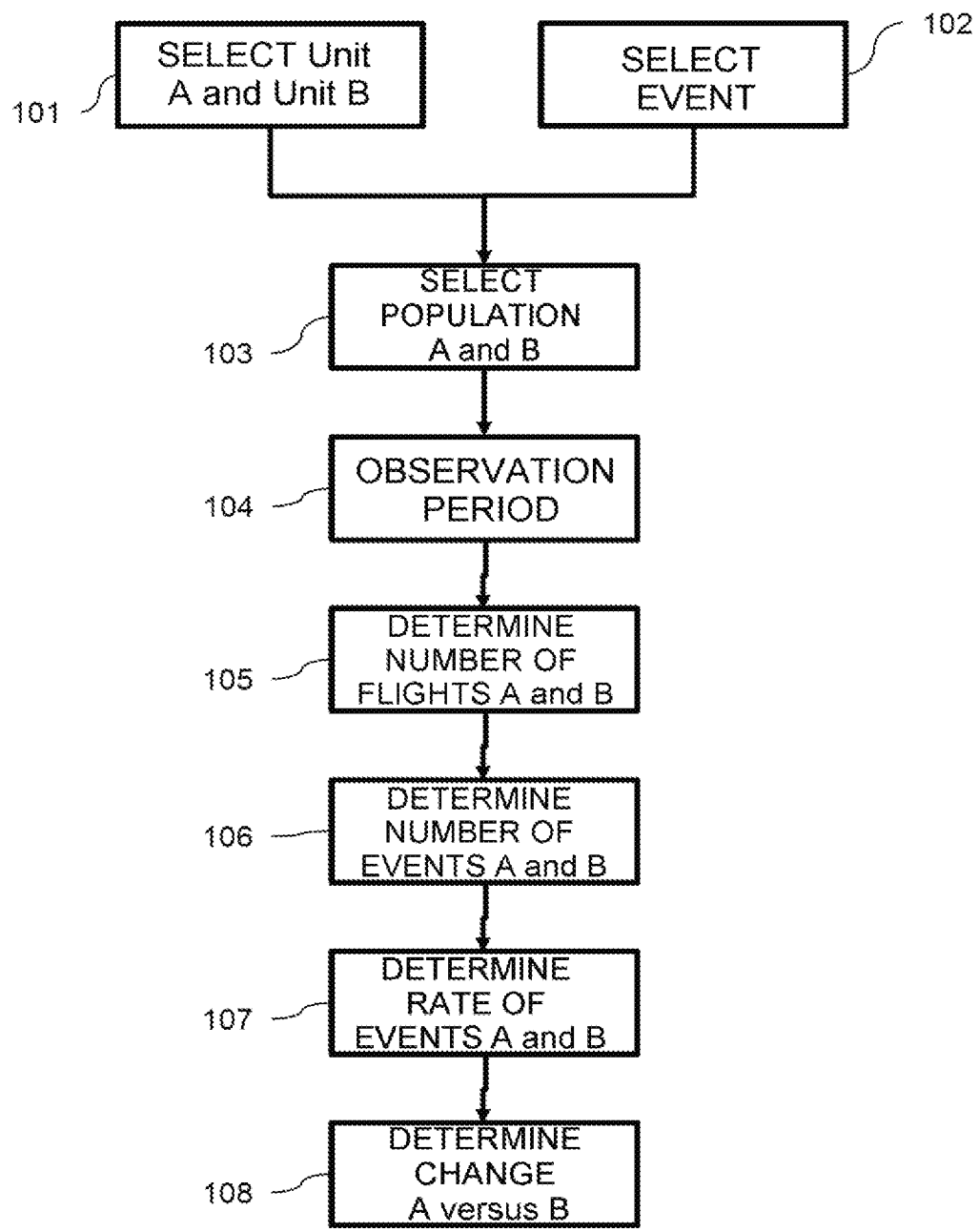
FIG. 1 diagrammatically illustrates a method for evaluating a rate of change of a failure according to an embodiment of the disclosure herein.

FIG. 1 diagrammatically illustrates a method for evaluating a rate of change of a failure according to an embodiment of the disclosure herein.

The method is executed by an electronic device connected to a plurality of databases, for example to the first database, second database and third database described previously.

The electronic device is potentially suitable for presenting an interface to a user and comprises an input device allowing a selection of data or information corresponding to a choice made by the user.

The method can comprise a step 101 of selection by the user of a first unit type and a second unit type. The second unit type corresponds for example to a modification or development of the first unit type. Each unit type is associated with an identifier allowing it to be recognized. The identifier is for example a product identifier or part number.

The method can comprise, simultaneously, previously or subsequently to the step 101, a step 102 of selection by the user of a particular event, for example a failure, hereinafter failure or "investigated failure". One or more monitoring messages is/are associated with this particular event. Thus, for example, one or more fault or monitoring messages emitted by an ECAM can correspond to—that is to say, be associated with—a given failure.

During the step 101 or the step 102, the user can define a period of time, period of time that defines the temporal data range of the data hereinafter used in the method.

In the absence of the steps 101 and/or 102, and of the corresponding selection by a user, the method can function with default values or can be interfaced with another system able to launch requests so as to proceed to an evaluation of a rate of change with parameters defined by any other means.

In a subsequent step 103, the electronic device connects to the first database, the first database comprising a plurality of serial numbers, each serial number corresponding to an aircraft and being associated with a list, called configuration list or "configuration", comprising at least one identifier, each identifier corresponding to a type of avionic unit installed in the aircraft. The electronic device extracts from this first database a first list, called first population, comprising all the serial numbers for which the first identifier is present in the configuration, and a second list, called second population, comprising all the serial numbers for which the second identifier is present in the configuration.

The otherwise, during step 103, the electronic device determines two lists. The first list corresponds to all the aircraft, more precisely to their associated serial numbers, comprising in their configurations the unit type that corresponds to the first identifier. That is to say that a unit of type corresponding to the first identifier is installed in the aircraft whose serial numbers are included in the first list. Likewise, the second list corresponds to all the aircraft, more precisely to their associated serial numbers, comprising in their configurations the unit type that corresponds to the second identifier. Thus, for the second list, a unit of type corresponding to the second identifier is installed in the aircraft whose serial numbers are included in the second list. The first list defines the population of aircraft comprising a first type of unit, the second list defines the population of aircraft comprising a second type of unit.

In a subsequent step 104, a period of observation is defined by the electronic device. This period of observation, or predetermined period of time, can have been defined during step 101 or 102. This predetermined period of time can also be defined according to the number of elements of the first or of the second list.

In a subsequent step 105, the electronic device connects to the second database, the second database comprising a plurality of serial numbers, each serial number being associated with a list, called flights, comprising time and date stamped information corresponding to flights made by the aircraft associated with the serial number. The electronic device determines, from this second database, for the serial numbers of the first population and the serial numbers of the second population, a cumulative number of flights made during a predetermined period of time by each population.

The otherwise, the electronic device connects to the second database of flights so as to count the cumulative number of flights identified for all the aircraft of the first population, respectively of the second population.

In subsequent step 106, the electronic device connects to the third database, the third database comprising a plurality of serial numbers, each serial number being associated with a list called messages list or "message", comprising monitoring messages received from at least one monitoring unit of the aircraft corresponding to the serial number. The electronic device determines, from the third database, for the serial numbers of the first population and the serial numbers of the second population, a cumulative number of monitoring messages corresponding to the warning message or messages associated with the failure.

The otherwise, the electronic device determines the number of monitoring messages (or fault or warning messages, etc.) corresponding to the message or messages previously selected for example during step 102 that are present in the messages lists associated with the serial numbers of the aircraft of the first population and of the second population. The otherwise, for each population, a cumulative number of fault messages (alerting, warning messages etc.) corresponding to the investigated failure is determined, and this during a predetermined period of time, or observation time.

In a subsequent step 107, the electronic device determines a first failure occurrence rate associated with the first unit type, the first failure rate corresponding to a ratio between the cumulative number of monitoring messages for the first population and the cumulative number of flights for the first population and a second failure occurrence rate associated with the second unit type, the second failure rate corresponding to a ratio between the cumulative number of monitoring messages for the second population and the cumulative number of flights for the second population The otherwise, for each unit type, the electronic device determines an occurrence rate of the investigated failure by establishing a ratio between the cumulative number of fault messages determined during the step 106 and the cumulative number of flights determined during the step 105. The electronic device therefore determines a failure occurrence rate expressed in "number of occurrences of a failure per flight".

In a subsequent step 108, the electronic device determines the rate of change as being equal to the difference between the second failure occurrence rate and the first failure occurrence rate divided by the first failure occurrence rate.

The otherwise, the electronic device determines a rate of change of the occurrence of the failure when changing from the first unit type to the second unit type. An objective comparison of the efficiency of the unit type on the appearance of the failure is therefore possible. The otherwise, an objective evaluation of the advantage of the second unit type compared with the first unit type is made possible by the electronic device.

Figure 2:
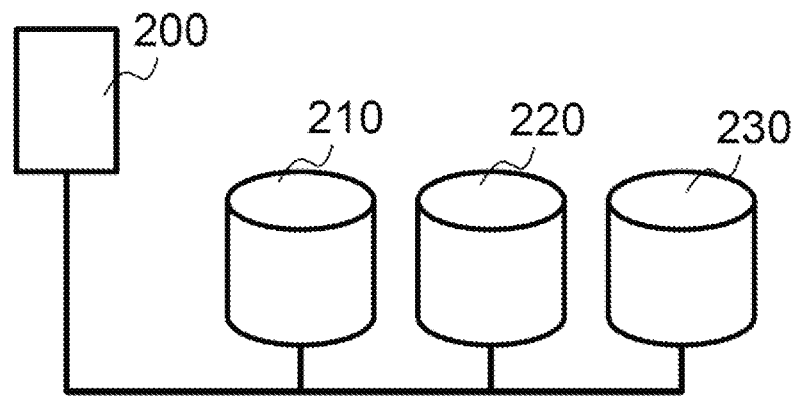
FIG. 2 diagrammatically illustrates an architecture comprising a plurality of databases and an electronic device suitable for evaluating a rate of change of a failure according to an embodiment of the disclosure herein.

FIG. 2 diagrammatically illustrates an architecture comprising a plurality of databases, in this case three databases 210, 220 and 230, and an electronic device 200 suitable for evaluating a rate of change of a failure according to an embodiment of the disclosure herein.

The electronic device 200 is suitable for implementing the method described in FIG. 1.

The database 210, respectively 220 and 230, corresponds to the first database, respectively the second and the third database.

According to an embodiment, one or more databases are accommodated by the electronic device 200.

Figure 3:
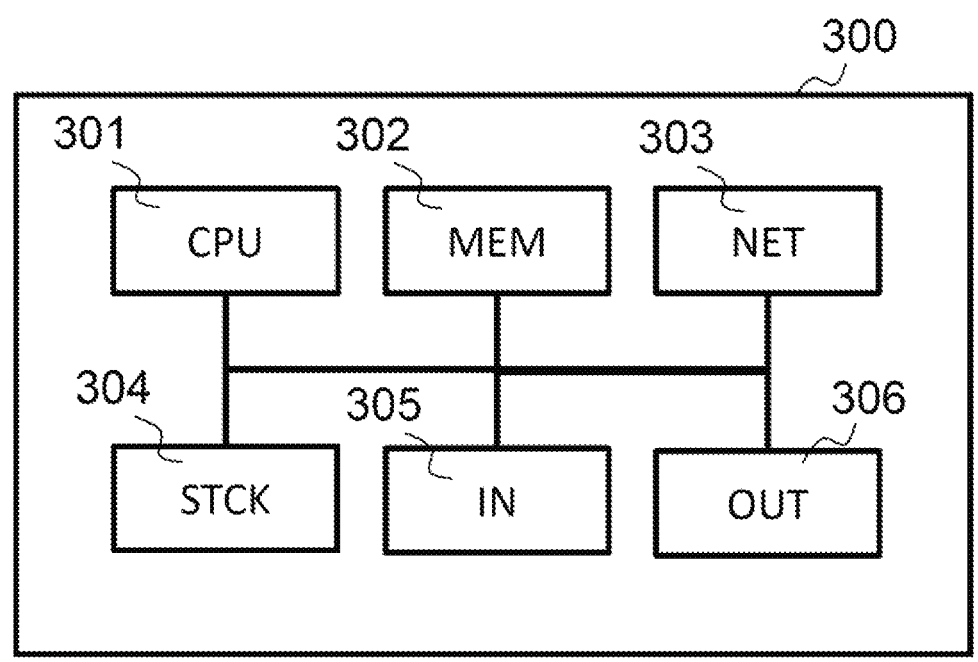
FIG. 3 diagrammatically illustrates a material architecture of an electronic device suitable for evaluating a rate of change of a failure according to an embodiment of the disclosure herein.

FIG. 3 diagrammatically illustrates the material architecture of an electronic device 300 suitable for executing a method for evaluating a rate of change of a failure, according to an embodiment of the disclosure herein.

The electronic device 300 corresponds for example to the electronic device 200 of FIG. 2.

The electronic device 300 is suitable for executing the method described in FIG. 1.

The electronic device 300 includes, linked by a communication bus: a central processing unit or CPU 301; a memory MEM 302 of the random access memory or RAM type and/or of the read only memory or ROM type, a network module NET 303, a storage module STCK 304 of the internal storage type and potentially one or more databases (not illustrated). The electronic device 300 potentially includes an input device IN 305, for example a keyboard and/or a mouse. The input device IN 305 can be a remote input device. The electronic device 300 potentially includes a device OUT 306 making it possible to display a man-machine interface, for example, a graphic interface. The interface OUT 306 can be tactile and can integrate the input device IN 305. The interface OUT 306 and the input device IN 305 can be virtual, acting for example from a page called "web" displayed on a remote device. The storage device STCK 304 can be of the hard disk drive or HDD type or solid state drive or SSD type or of the external storage medium reader type, such as a secure digital (SD) card reader. The CPU 301 can record data or information in the memory MEM 302 or in the storage module STCK 304. The CPU 301 can read the data recorded in the memory MEM 302, in the storage module STCK 304 or in a database. These data can correspond to configuration parameters, parameters received by the interface IN 305, after being input or selected by the user, or to data that have been read in a connected database. The network module NET 303 allows the electronic device 300 to be connected to a communication network, and potentially to a plurality of databases. The network module NET 303 allows the electronic device 300 to send, respectively to receive, messages to, respectively from, one or ore connected databases.

The CPU 301 is capable of executing instructions loaded into the memory MEM 302, for example, from the storage module STCK 304 or from a communication network via the network module NET 303. When the electronic device 300 is switched on, the CPU 301 is capable of reading instructions from the memory MEM 302 and of executing them. These instructions form a computer program causing the implementation, via the CPU 301, of all or some of the methods and steps described above, particularly in the description of FIG. 1. Thus, all or some of the methods and steps described above can be implemented as software through execution of a set of instructions by a programmable machine, such as a digital signal processor or DSP, or a microcontroller. All or some of the methods and steps described here can also be implemented in material form by a dedicated machine or component, such as a field-programmable gate array or FPGA or an application-specific integrated circuit or ASIC. The functions of the electronic device 300 can be integrated in a computer server known to a person skilled in the art.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for evaluating a rate of change of a failure, the failure indicated by at least one warning message, between an avionic unit of a first unit type associated with a first identifier, and a second unit type associated with a second identifier, the method being executed by an electronic device, the electronic device comprising a processor for executing instructions loaded into a memory, and a network module, and an input device, the method comprising:
  presenting an interface to a user and receiving user selections, from the interface, of:
    the first unit type,
    the second unit type,
    a period of time, and
    the at least one warning message indicating failure;
  connecting to a first database, the first database comprising a plurality of serial numbers, each serial number corresponding to an aircraft and being associated in the first database with a configuration list comprising a plurality of avionic unit identifiers, each avionic unit identifier corresponding to a type of avionic unit installed in the aircraft;
  extracting, from the first database, a first list, called first population, comprising all serial numbers for which the first identifier is present in the configuration list, and a second list, called second population, comprising all serial numbers for which the second identifier is present in the configuration list;
  connecting to a second database, the second database comprising the plurality of serial numbers, each serial number being associated in the second database with a flight list comprising time and date stamped information corresponding to flights made by the aircraft associated with the serial number;
  determining, from the second database, for the serial numbers of the first population and the serial numbers of the second population, a cumulative number of flights made by each population during the period of time;
  connecting to a third database, the third database comprising the plurality of serial numbers, each serial number being associated with a message list comprising monitoring messages received from at least one monitoring unit of the aircraft corresponding to the serial number;
  determining, from the third database, for serial numbers of the first population and serial numbers of the second population, a cumulative number of monitoring messages corresponding to the at least one warning message;
  determining a first failure occurrence rate associated with the first unit type, the first failure rate corresponding to a ratio between the cumulative number of monitoring messages corresponding to the at least one warning message for the first population and the cumulative number of flights for the first population, and a second failure occurrence rate associated with the second unit type, the second failure rate corresponding to a ratio between the cumulative number of monitoring messages corresponding to the at least one warning message for the second population and the cumulative number of flights for the second population;

determining the rate of change as being equal to a difference, between the second failure occurrence rate and the first failure occurrence rate, divided by the first failure occurrence rate; and displaying, in the interface presented to the user, the determined rate of change for the user.

2. An electronic device comprising a processor for executing instructions loaded into a memory, and a network module, the electronic device allowing an evaluation of a rate of change of a failure, the failure being indicated by at least one warning message, between an avionic unit of a first unit type associated with a first identifier, and a second unit type associated with a second identifier, the electronic device being configured for:

presenting an interface to a user and receiving user selections, from the interface, of:
the first unit type,
the second unit type,
a period of time, and
the at least one warning message indicating failure;

connecting to a first database, the first database comprising a plurality of serial numbers, each serial number corresponding to an aircraft and being associated in the first database with a configuration list comprising a plurality of avionic unit identifiers, each avionic unit identifier corresponding to a type of avionic unit installed in the aircraft;

extracting, from the first database, a first list, called first population, comprising all serial numbers for which the first identifier is present in the configuration list, and a second list, called second population, comprising all serial numbers for which the second identifier is present in the configuration list;

connecting to a second database, the second database comprising the plurality of serial numbers, each serial number being associated in the second database with a flight list comprising time and date stamped information corresponding to flights made by the aircraft associated with the serial number;

determining, from the second database, for the serial numbers of the first population and the serial numbers of the second population, a cumulative number of flights made by each population during the period of time;

connecting to a third database, the third database comprising the plurality of serial numbers, each serial number being associated with a message list comprising monitoring messages received from at least one monitoring unit of the aircraft corresponding to the serial number;

determining, from the third database, for serial numbers of the first population and serial numbers of the second population, a cumulative number of monitoring messages corresponding to the at least one warning message;

determining a first failure occurrence rate associated with the first unit type, the first failure rate corresponding to a ratio between the cumulative number of monitoring messages corresponding to the at least one warning message for the first population and the cumulative number of flights for the first population, and a second failure occurrence rate associated with the second unit type, the second failure rate corresponding to a ratio between the cumulative number of monitoring messages corresponding to the at least one warning message for the second population and the cumulative number of flights for the second population;

determining the rate of change as being equal to a difference, between the second failure occurrence rate and the first failure occurrence rate, divided by the first failure occurrence rate; and displaying, in the interface presented to the user, the determined rate of change for the user.

3. A non-transitory computer readable storage medium having stored thereon computer executable instructions embodied in the computer readable storage medium and when executed by a processor of a computer performs a method for evaluating a rate of change of a failure, the failure being indicated by at least one warning message, between an avionic unit of a first unit type associated with a first identifier, and a second unit type associated with a second identifier, the method being executed by an electronic device, and a network module, the method comprising:

presenting an interface to a user and receiving user selections, from the interface, of:
the first unit type,
the second unit type,
a period of time, and
the at least one warning message indicating failure;

connecting to a first database, the first database comprising a plurality of serial numbers, each serial number corresponding to an aircraft and being associated in the first database with a configuration list comprising a plurality of avionic unit identifiers, each avionic unit identifier corresponding to a type of avionic unit installed in the aircraft;

extracting, from the first database, a first list, called first population, comprising all serial numbers for which the first identifier is present in the configuration list, and a second list, called second population, comprising all serial numbers for which the second identifier is present in the configuration list;

connecting to a second database, the second database comprising the plurality of serial numbers, each serial number being associated in the second database with a flight list comprising time and date stamped information corresponding to flights made by the aircraft associated with the serial number;

determining, from the second database, for the serial numbers of the first population and the serial numbers of the second population, a cumulative number of flights made by each population during the period of time;

connecting to a third database, the third database comprising the plurality of serial numbers, each serial number being associated with a message list comprising monitoring messages received from at least one monitoring unit of the aircraft corresponding to the serial number;

determining, from the third database, for serial numbers of the first population and serial numbers of the second population, a cumulative number of monitoring messages corresponding to the at least one warning message;

determining a first failure occurrence rate associated with the first unit type, the first failure rate corresponding to a ratio between the cumulative number of monitoring messages corresponding to the at least one warning message for the first population and the cumulative number of flights for the first population, and a second failure occurrence rate associated with the second unit type, the second failure rate corresponding to a ratio between the cumulative number of monitoring messages corresponding to the at least one warning message for the second population and the cumulative number of flights for the second population;

determining the rate of change as being equal to a difference, between the second failure occurrence rate and the first failure occurrence rate, divided by the first failure occurrence rate; and displaying, in the interface presented to the user, the determined rate of change for the user.

* * * * *